(12) United States Patent
Daly et al.

(10) Patent No.: US 11,459,994 B2
(45) Date of Patent: Oct. 4, 2022

(54) START STOP OVERRIDE MODULE

(71) Applicant: Metra Electronics Corp., Holly Hill, FL (US)

(72) Inventors: Charles David Daly, Holly Hill, FL (US); William H. Jones, Jr., Holly Hill, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 17/064,190

(22) Filed: Oct. 6, 2020

(65) Prior Publication Data
US 2021/0033056 A1 Feb. 4, 2021

Related U.S. Application Data

(63) Continuation-in-part of application No. 16/732,433, filed on Jan. 2, 2020, now Pat. No. 10,844,821.

(60) Provisional application No. 62/787,424, filed on Jan. 2, 2019.

(51) Int. Cl.
*F02N 11/08* (2006.01)
*H04L 12/40* (2006.01)

(52) U.S. Cl.
CPC .......... *F02N 11/0822* (2013.01); *H04L 12/40* (2013.01); *H04L 2012/40215* (2013.01); *H04L 2012/40273* (2013.01)

(58) Field of Classification Search
CPC .... F02D 41/3845; F02D 1/06; F02D 2250/14; F02D 2041/225; F02D 2041/286; F02D 2200/0602; F02D 2200/0616; F02M 63/023; F02M 63/0265; F02M 65/003; F02M 63/0225; G01M 15/09
See application file for complete search history.

(56) References Cited

U.S. PATENT DOCUMENTS

| | | | | |
|---|---|---|---|---|
| 2008/0029058 A1* | 2/2008 | Duesmann | .......... | F02D 41/0002 123/198 F |
| 2015/0148192 A1* | 5/2015 | Lyon | .................. | F02N 11/0822 477/203 |
| 2019/0219019 A1* | 7/2019 | Khafagy | ............... | B60W 10/08 |

* cited by examiner

*Primary Examiner* — Xiao En Mo
(74) *Attorney, Agent, or Firm* — J. Wiley Horton

(57) ABSTRACT

An override module allowing a vehicle operator to default the status of an automated start-stop system to "off" A preferred embodiment uses a module that is installed on the vehicle's CAN bus.

7 Claims, 4 Drawing Sheets

START STOP OVERRIDE MODULE

CROSS-REFERENCES TO RELATED APPLICATIONS

This non-provisional patent application is a continuation of U.S. patent application Ser. No. 16/732,433. The parent application listed the same inventors. It was filed on Jan. 2, 2020.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of motor vehicle control systems. More specifically, the invention comprises a module for overriding an automatic engine start-stop feature included in many modern vehicles.

2. Description of the Related Art

Increased fuel economy is a common goal in the field of motor vehicles. Government regulatory entities are mandating a steady average increase in economy for each manufacturer. A good example of this trend is the "Euro 5" standard promulgated in the European Union. The Euro 5 standard includes an enhanced driving model intended to make economy and emissions testing more closely resemble actual driving conditions. One of its components is an increased idling time—reflecting the time a vehicle sits still in traffic.

Many vehicles now incorporate automated "start-stop" functions. The goal of this feature is to switch off an internal combustion engine when it is not needed—such as when a vehicle is idling at a traffic control device. The system automatically restarts the internal combustion engine once the need for power is detected. Consider an example for a vehicle having an automatic transmission: A driver encounters a red light and brakes to a stop. After the vehicle has remained stationary for a short interval—such as five seconds—the automatic engine control unit shuts off the internal combustion engine. The engine remains off while the vehicle sits stationary and the driver keeps the brake applied.

Then the traffic light turns green. The driver lifts his or her foot off the brake pedal and begins moving it toward the accelerator. As soon as the brake pedal returns to the "off" position, the automatic start-stop system commands a restart of the internal combustion engine. For a well-designed system, the engine is ready to deliver power by the time the driver's foot reaches the accelerator.

Additional features are typically needed to ensure the smooth operation of an automated start-stop system. For example, there will be instances where the internal combustion engine is needed during periods where the vehicle is stationary and the brake is applied. The engine may be needed to: (1) Power the heating or cooling systems; (2) Provide hydraulic pressure to the power steering system; and/or (3) Provide charging current to a depleted battery. Thus, a sophisticated start-stop system may use a processor to "consider" these and other factors before triggering an automated engine stop.

Those skilled in the art will know that vehicles incorporating automated start-stop systems often include many other modifications and enhancements to make the systems operate reliably. A discussion of these additional systems is beyond the scope of this disclosure. Suffice it to say that modern manufacturers have incorporated these modifications to produce generally reliable systems. These systems do produce a measurable increase in fuel economy, with independent testing demonstrating an improvement between three and seven percent. For a vehicle spending a large amount of time in stop and go traffic, the increase can be even greater.

Nevertheless, some owners do not like the automated start-stop feature. A first reason is the fact that the long-term effects on vehicle endurance and reliability are not yet well understood. The manufacturers contend that a well-designed system will not have a negative effect, but the systems have not been around long enough to fully demonstrate this assertion. Secondly, many owners do not like the perceived lag in available power (which in some instances may be quite real). As an example, a driver may stop at an intersection and need to accelerate rapidly to merge into traffic. An automated start-stop system will often shut down the engine in this circumstance. Even if the automated system is highly reliable, it is unsettling for a driver contemplating a high speed merge to feel the engine "die." For these reasons, manufacturers often provide a manual override for the automated start-stop feature.

A good example of this manual override is found in vehicles manufactured by the Ford Motor Corporation. Ford provides a manual override button near the instrument cluster. The user simply presses this button to deactivate the automated start-stop feature. The start-stop feature will remain "off" until the user shuts down and exits the vehicle. However, the next time the user reenters the vehicle and starts it, the automated start-stop feature will revert to the "on" state. In other words, while the manual override feature is provided, the user must activate it every time the vehicle is driven.

In other instances the manufacturer simply provides no manual override function at all. The automated start-stop feature remains active in those cases and there is nothing the user can do about it. There exists a demand for a device allowing a user to selectively turn off the automated start-stop feature, and thereafter have it remain off. The present invention provides such a solution.

Those skilled in the art will understand how digital communications occur within modern motor vehicles. However, it is nevertheless helpful to provide an exemplary top-level description of these systems. Modern vehicles include many separate processors running simultaneously. These units control the engine, the transmission, the heating and cooling systems, etc. Different manufacturers arrange these control systems in different ways. However, many now use a Controller Area Network ("CAN") for communications. A CAN bus connects the components.

The general implementation of digital control uses a CAN data bus distributed throughout the vehicle. The data bus sends digital messages (such as the state of a controlling switch) that may be received by any component connected to the bus. The data bus does not provide electrical power to the actuating components such as a seat motor (though it may supply some low level power to other devices). Power is supplied separately to the actuating components through a power distribution harness.

As far as the user is concerned, the new digital paradigm often appears to function just like the old analog paradigm. As an example, if the user wishes to roll down a window, he or she still presses a designated button and the window rolls down. However, the button is not "making" an analog circuit and is not serving as part of the path for the electrical current driving the window motor. Instead, both the button and the motor are connected to a data bus, and the data bus is likely connected to a controlling microprocessor (sometimes called a "Body Control Unit" or "BCU"). The switch sends a digital message specifying its identity and the fact that the switch is in an "ON" state. The Body Control Unit receives and interprets this message, then makes an appropriate response. In response to the window control button being placed in the "ON" position, the body control unit sends a digital message to the CAN bus instructing the appropriate window motor to move the window. The window motor has an associated controller that receives and decodes this digital instruction. Power electronics within the window controller then activate a driving motor to move the window (The power electronics may be in a remotely located relay but the result is the same).

While the digital approach sounds complicated, it is in many instances much more efficient to install and run than a traditional system. Rather than routing dedicated wiring harnesses from switches to the components they control, the digital approach allows the vehicle manufacturer to provide a single data harness and only a few power harnesses. New components may also be added without the need to add additional wiring.

The first widely-used system implementing the digital paradigm was developed by Robert Bosch, GmbH in the early 1980's. Bosch called its system the "CAN bus," which is how the "CAN" name became commonly used. Bosch actually released its protocol to the Society of Automotive Engineers with the initial hope of creating a unified communication platform across all vehicle makes and models, though Bosch did not propose to offer the standard free of licensing fees.

The goal of a uniform standard has largely gone unrealized, with the various vehicle manufacturers adopting proprietary systems instead. Even so, the general characteristics of the original CAN standard are found in most vehicle operating protocols. In general, a CAN network is a "masterless" system in which various microcontrollers communicate without the need for one defined "host" computer. This is a significant feature, as a modern vehicle may contain as many as 70 separate electronic control units. The two most significant control units are typically the Engine Control Unit ("ECU") and the aforementioned Body Control Unit ("BCU"). However, as discussed in the preceding example, each individual window motor is likely to have a separate controller. Other controllers may be provided for a blower fan, an air conditioning compressor, power mirrors, air bags, air-inflated suspension "springs," an automatic transmission, and even small things like the dimming functions of a rear-view mirror.

The CAN bus itself is typically just a twisted-pair (two conductors twisted around a common axis to help cancel unwanted emissions). However, although no universal CAN standard for connectors has evolved, it is common to include the CAN pair in a four-wire cable. The four-wire cable then carries CAN-, CAN+, Power Voltage, and Ground. Using this single connector thereby allows the simultaneous connection of a component to the control bus and the power distribution bus.

The arrangement of controllers on a communication network varies widely among manufacturers. FIG. 1 shows a simplified depiction of one possible architecture. In this scheme Body Control Unit 10 ties multiple separate networks together. CAN bus 20 is used to connect the BCU to other "major" control units. These include Transmission Control Unit 12, Engine Control Unit 14, and ABS Control Unit 16. The automated start-stop feature discussed previously is generally contained within the software running on ECU 14.

In the example shown, instrument cluster 18 is controlled directly by BCU 10. Where direct control is used, a ribbon cable may provide a connection between the BCU and the instrument cluster.

BCU 10 is also connected to a second CAN bus 22. CAN bus 22 provides communication with numerous other controllers directing the actions of the climate control system, the mirrors, the power seats, etc. Significant to most embodiments of the present invention, BCU 10 controls the vehicle's lighting (including the brake lights). A brake pedal position sensor feeds a status signal to BCU 10 via CAN bus 22. In this example the status signal is created by a simple switch that "tells" the BCU the brake pedal has left its home (off) position. Such a switch is commonly used to "tell" the BCU that the brake lights need to be illuminated. It does not control the actual braking of the vehicle.

In other systems the brake pedal position switch will feed directly into the BCU (via dedicated connector pins) rather than using a CAN bus message. The present invention can operate with such a system as well.

Finally, those skilled in the art will know that some manufactures use simpler and cheaper busses to connect the BCU to things like the mirrors and the wipers. A common example is a Local Interconnect Bus ("LIN" bus). The present invention is not confined to any particular type of bus, and the mention of a type of bus is properly understood as exemplary.

BRIEF SUMMARY OF THE PRESENT INVENTION

The present invention comprises an override module allowing a vehicle operator to default the status of an automated start-stop system to "off" A preferred embodiment uses a module that is installed on the vehicle's CAN bus.

REFERENCE NUMERALS IN THE DRAWINGS

Figure 1:
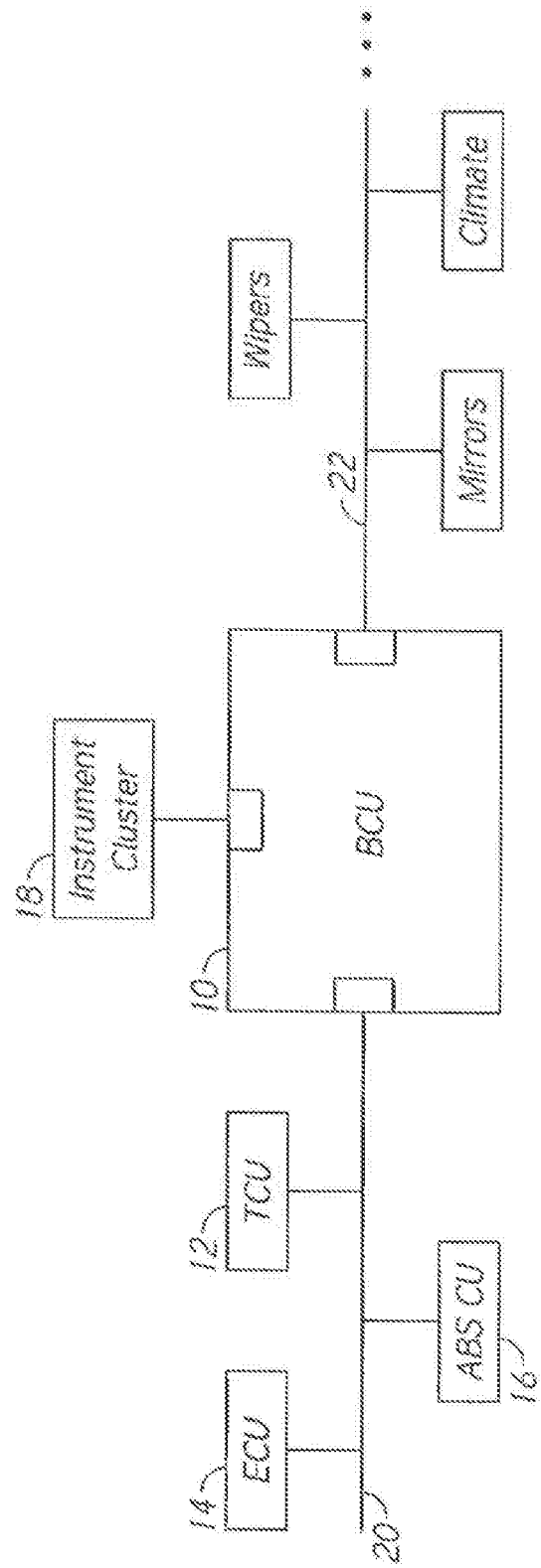
FIG. 1 is a schematic view, showing a prior art arrangement of vehicle control units.

10 Body Control Unit
12 Transmission Control Unit
14 Engine Control Unit

16 ABS Control Unit
18 instrument cluster
20 CAN bus
22 CAN bus
24 connector
26 connector
28 switch assembly
30 indicator light
32 contact switch
34 connector
36 override module
38 power supply
40 processor
42 connector
44 connector
46 override module

DETAILED DESCRIPTION OF THE INVENTION

Figure 2:
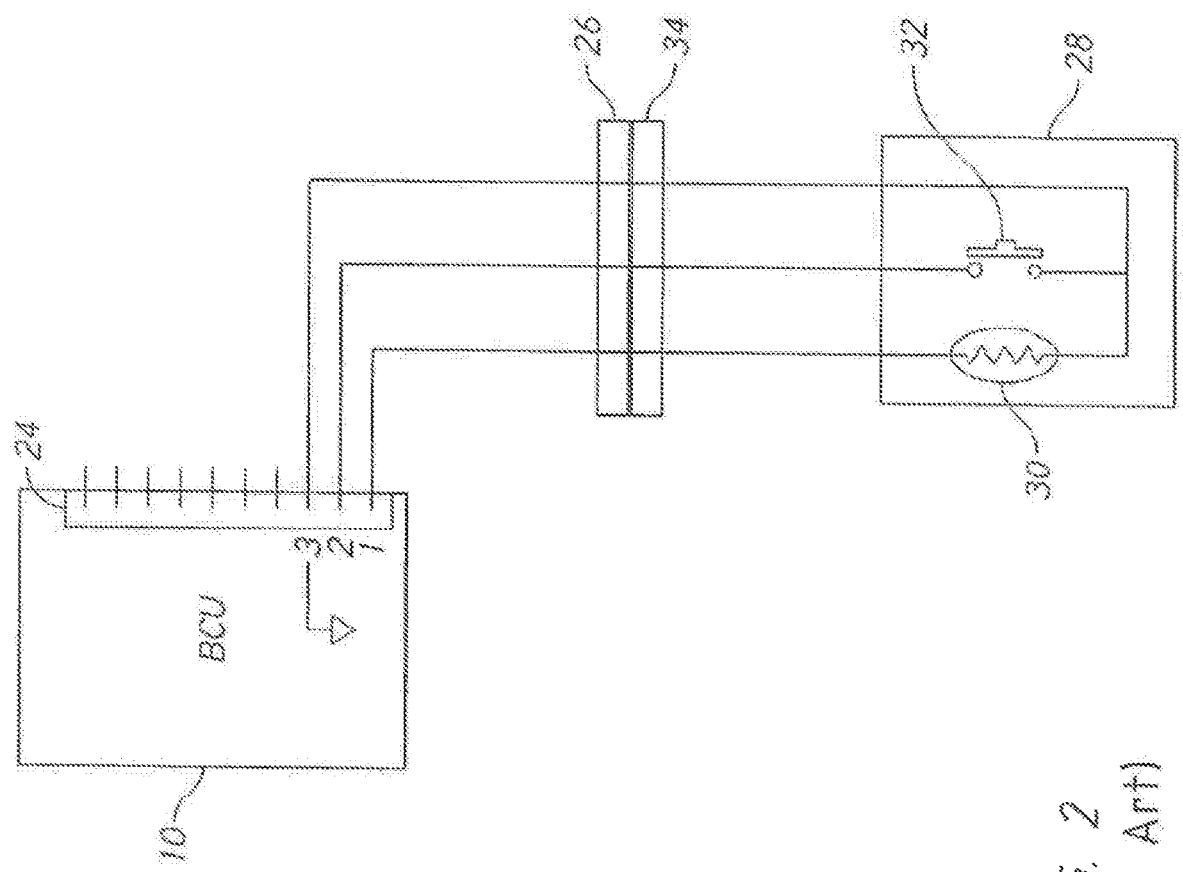
FIG. 2 is a schematic view, showing a prior art manual override button.

The first embodiment of the present invention applies to start-stop systems that include a manual override button. An example of such a system is shown in FIG. 2. Switch assembly 28 provides the manual override function. It is connected directly to Body Control Unit 10. In this instance BCU 10 has a large connector 24 with multiple pins (possibly as many as 100 pins in a single large connector). These pins directly connect the BCU to various buttons and indicators. In the example shown, Pins 1-3 connect to switch assembly 28. Connector 26 mates to connector 34 in order to provide electrical connections to switch assembly 28.

Pin 3 is ground at all times. Pin 2 is the "sense" pin for the condition of the switch. It is normally "hot," meaning it is supplied with a positive voltage from the BCU (depending on the manufacturer this is usually +5V, +7V, or +12V). When a user pressed contact switch 32, Pin 2 is pulled to ground and the BCU senses this change in voltage on Pin 2 as an indication that the user wishes to override the automated start-stop feature. The BCU then transmits a CAN "override" message to the ECU and the ECU deactivates the automated start-stop feature. The BCU also applies voltage to Pin 1, which illuminates indicator light 30. The illumination of the indicator light tells the driver that the automated start-stop feature has been disabled. In this system the BCU and ECU default to the status of the automated start-stop feature being "on" the next time the vehicle is operated. Thus, as explained previously, the user must press the button each time.

Figure 3:
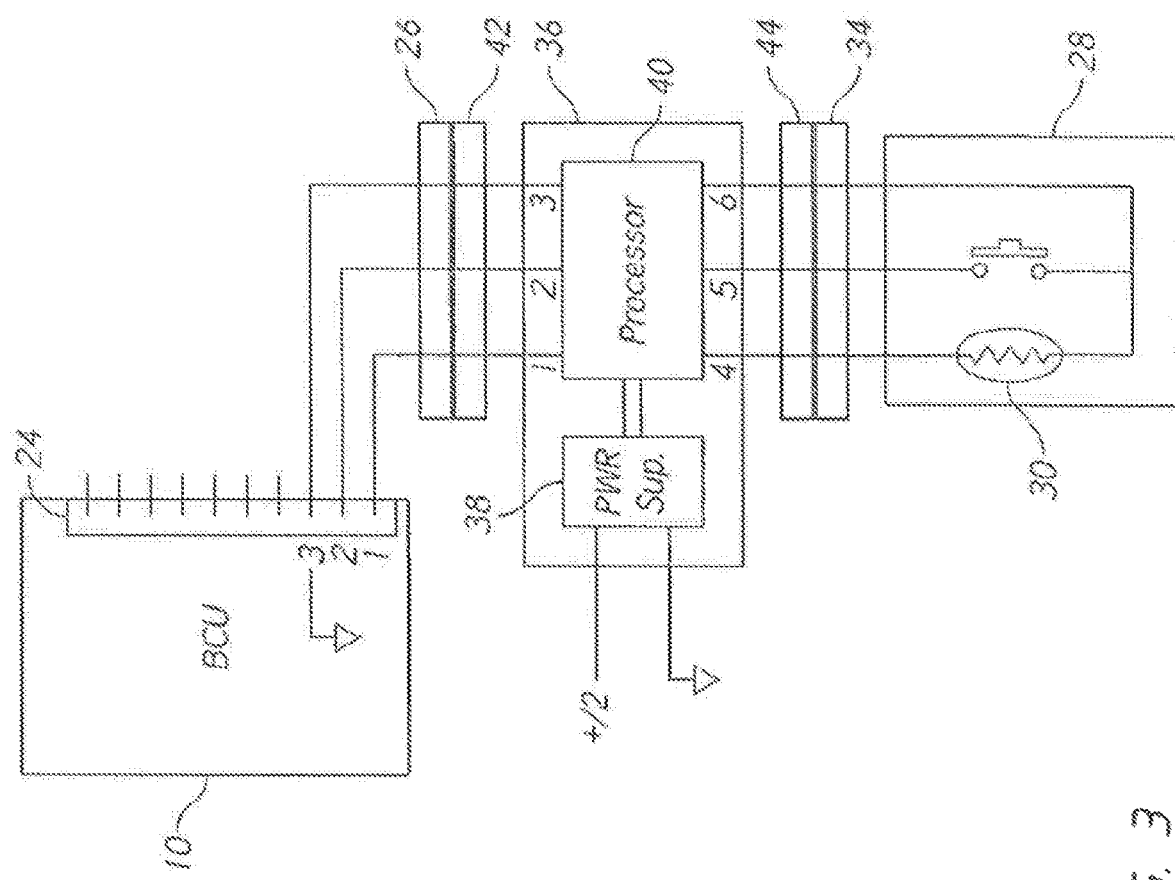
FIG. 3 is a schematic view, showing an embodiment of the present invention.

FIG. 3 shows the same arrangement with the addition of the inventive override module 36. Override module 36 is configured to be plugged "in line." Connector 42 on the override module plugs into the existing connector 26. Connector 44 on the override module plugs into the existing connector 34. Switch assembly 28 remains in place.

Override module 36 is provided with power supply 38 and processor 40. Power supply 38 in this example is connected to a switched +12V source and ground. The power supply provides power to processor 40. In the preferred mode of operation, processor 40 behaves as follows:

(1) When vehicle power is switched on, processor 40 "wakes up;"

(2) A delay is instituted in order for the other vehicle systems to become fully operational. Any suitable delay can be used. For example, 5 seconds can be used;

(3) Once the delay has run, processor 40 connects Pin 2 to Pin 3 for an interval, which should instruct the BCU to turn off the automated start-stop feature;

(4) The processor then monitors the condition of Pin 1. If voltage is sensed on Pin 1 (indicating the successful disabling of the start-stop feature), then voltage is passed through from Pin 1 to Pin 4 and Pin 3 is also connected to Pin 6 (causing indicator light 30 to illuminate); and (5) If voltage is not sensed on Pin 1, then processor 40 again connects Pin 2 to Pin 3 for an interval. The process is repeated until success is indicated by a voltage being sensed on Pin 1.

The pin nomenclature described is found on Ford vehicles. Other manufacturers will have different pin numbers. An optional embodiment of override module 36 is the "scavenging" of power from the BCU itself rather than providing an independent connection. In this version the voltage found on Pin 2 is used to power the override module directly from the BCU.

The reader will thereby understand in this embodiment of FIG. 3 that the operation of the override module is fully automated and requires no attention from the driver. Each time the vehicle is entered and started, the BCU will be "fooled" into thinking that the driver has manually depressed the manual override button.

Figure 4:
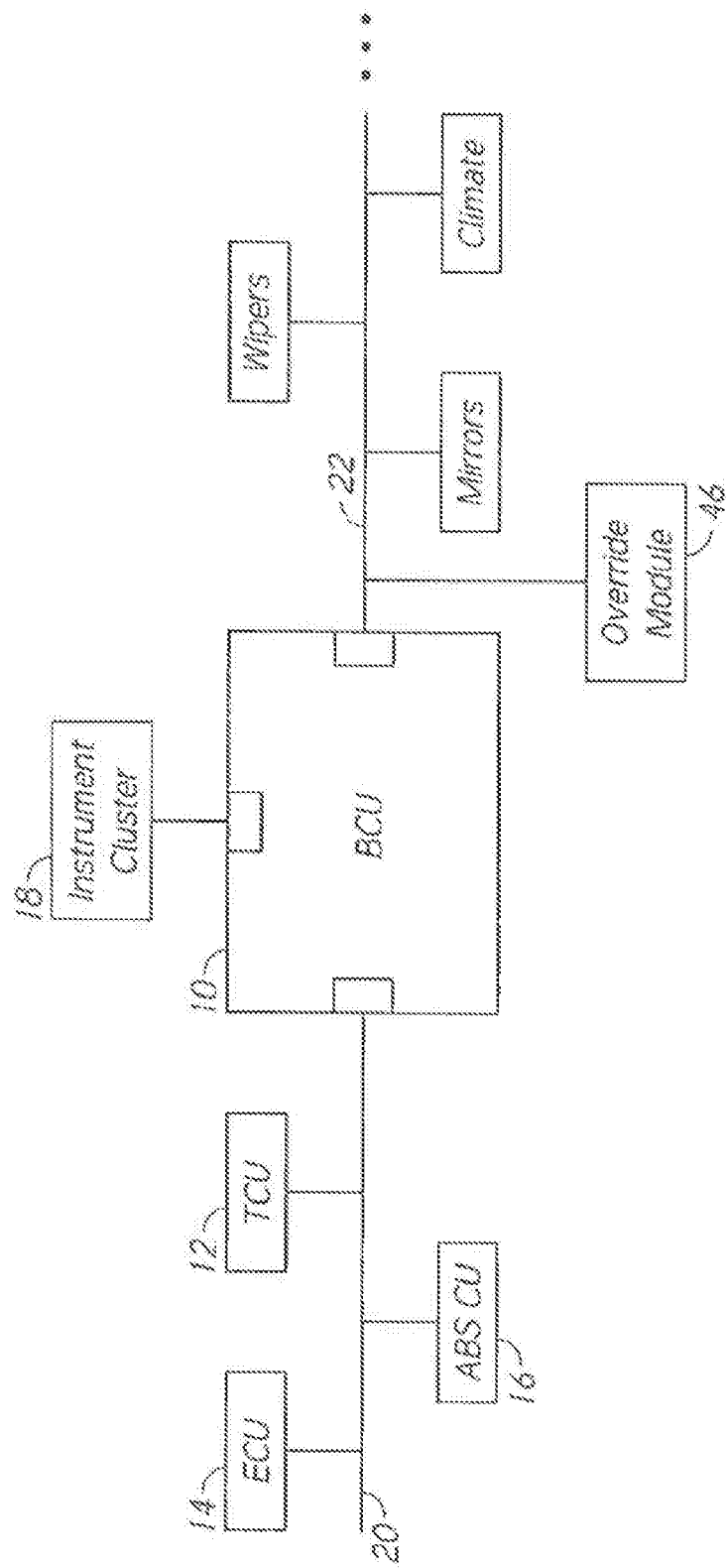
FIG. 4 is a schematic view, showing an embodiment of the present invention.

A different embodiment is needed for vehicles that do not provide a manual override button (Note that this different embodiment can be used even where a manual override button is also present). An example of these embodiments is provided in FIG. 4. FIG. 4 represents the same communications architecture as depicted in FIG. 1, with the addition of override module 46. In this instance override module 46 is a processor that is connected to CAN bus 22. It can read messages transmitted on the CAN bus and place messages on the CAN buss as well. The implementation of this embodiment will be dependent upon the vehicle in which it is installed. This is true because the message formatting for CAN bus messages varies greatly among the different manufacturers.

Override module 46 is preferably able to automatically detect the type of vehicle it has been installed in. Auto detection methods are disclosed in detail in commonly owned U.S. Pat. Nos. 8,014,920 and 8,214,105. These prior patents are hereby incorporated by reference.

In addition to the methods disclosed in the incorporated patents, it is possible to detect the vehicle type by trial-and-error. There are a limited number of CAN bus message protocols in use and all these protocols can be stored within a processor in override module 46. The override module can then apply a succession of protocols until it starts to "see" valid CAN messages being produced. Once valid message are produced the right protocol has been identified. It is also possible to simply allow the user to set the vehicle type via a wired or wireless download from another device, the setting of a row of DIP switches, the setting of a rotary switch, or some other methodology.

Once proper CAN communication has been established between override module 46 and the host vehicle, it is necessary to determine what type of CAN message can be used to defeat the automatic start-stop function. The preferred method is a brake status message. As an example, Ford vehicles starting in 2018 use the following combination of events to activate the "stop" part of the start-stop function: (1) Foot on brake as indicated by brake status message being "on;" (2) Vehicle speed is zero; (3) Seatbelt buckled; (4) Climate control condition in a specified range; (5) Steering wheel stationary; (6) Charging system status in specified range; and (7) Defined time interval elapsed.

When these conditions are met, override module 46 will place on the CAN bus a brake status message indicating that the brake is "off." The presence of this message will cause the BCU and ECU to keep the engine running. The override module only needs to send this message periodically—sufficiently often to prevent engine stop. Once the "brake off" message is sent the normal vehicle systems will transmit a "brake on" message shortly thereafter (since the brake is in fact on).

In order to determine when a "brake off" message needs to be generated, override module 46 does not need to monitor for all the conditions that the BCU and ECU normally monitor. In this example it only needs to monitor the CAN bus messages to determine when two conditions are true. These are: (1) Vehicle speed is zero; and (2) A "brake on" message has been sent. Once the vehicle speed is back above zero the override module will go dormant until the vehicle speed again reaches zero.

Power can be provided to override module 46 by any suitable method. It is preferably provided with a switched power source so that it will not remain needlessly active. The "brake off" message is a good way to defeat the automatic start-stop function, but there are other ways as well. A CAN signal that will defeat the automatic start-stop function is referred to as an "automated engine stop defeating message." A CAN message of "brake status: off" is a good example of an automated engine stop defeating message. Examples of automated engine stop defeating messages are explained in the following sections.

EXAMPLE ONE—The use of brake status message. The use of brake status messages takes advantage of the fact that the automated start-stop function in all vehicles presently known to the inventors require the vehicle speed to be zero and the brake pedal to be applied. In this example the override module becomes active as the vehicle speed nears zero (such as by monitoring a vehicle speed and coming out of a dormant mode when the speed is decreasing and falls below 5 mph). Once the vehicle speed is zero, the override module monitors for the application of the brake pedal (such as by detecting a CAN message of "brake status: on"). Upon detecting the brake pedal being applied, the override module sends a message indicating that the brake pedal is no longer being applied (such as a CAN message of "brake status: off"). This "false" CAN message will be superseded by a normal "brake status: on" message sent by a conventional controller a short time later. Thus, the override module should be programmed to send a "brake status: off" message periodically, such as once every 500 ms.

The presence of these "brake status: off" messages interrupts the automated start-stop function (by "fooling" the other controllers into believing that the driver has lifted is or her foot off the brake pedal) and defeats the automated start-stop function. The vehicle simply continues to idle without the engine shutting off. When the driver actually does lift his or her foot off the brake pedal and accelerate, the override module again becomes inactive, and will remain so until the vehicle speed once again near zero.

EXAMPLE TWO—The use of a steering wheel angle message. Modern vehicles employ one or more (typically three) sensors to determine the present angular position of the steering wheel. A current value for this parameter is often transmitted on a CAN bus. In this embodiment the inventive override module again becomes active as the vehicle speed nears zero. Once the vehicle speed reaches zero the override module reads the present value for the steering wheel angle, then increments the value slightly and transmits a CAN message with the incremented value. As an example, a vehicle comes to rest with a steering wheel angle of +2.4 degrees. The override module reads this value, increments it by 0.2 degrees and then transmits a CAN message indicating +2.6 degrees.

For some vehicle types the power steering control module interprets varying steering wheel positions as a demand for power steering "boost" and this will cause the engine controller to interrupt the automatic start-stop function and leave the engine running. Further, the override module is preferably programmed to regularly update the steering wheel angle message so that the other controllers "believe" that the driver is moving the wheel back and forth over a small range. This interpretation of the steering wheel angle messages will cause the engine to continue running.

EXAMPLE THREE—The use of a steering torque message. Many vehicles now include electric power steering, in which an electric motor provides torque to assist the driver rather than a conventional hydraulic circuit. The electric systems include the ability to sense the driver's input torque even when the wheel is not in motion (or not in any significant motion). The inventive override module again becomes active when the vehicle's speed approaches zero. The override module then creates a series of user steering torque messages—such as periodic positive and negative steering torque values. The other controllers interpret these messages as a demand for power steering boost. This interpretation of the user steering torque messages will cause the engine to continue running.

EXAMPLE FOUR—The use of a climate control message. Most automated start-stop functions monitor the current state of the vehicle's heating and cooling systems, and keep the engine running if either heating or cooling is needed. There is a wide variety of messaging schemes among the various manufacturers, so a single approach is not practical. However, for many manufacturers a "current temperature" CAN message is compared to a "current commanded temperature" message to determine whether heating or cooling is needed. In this example, the inventive override module again becomes active when the vehicle's speed approaches zero. At that point the override module creates periodic CAN messages for the current temperature that are (in the winter) below the commanded temperature or (in the summer) above the commanded temperature.

The generated CAN messages will cause the engine to keep running. The generated CAN messages may also cause the environmental control system to take action (such an energizing the air conditioning compressor and running the blower). While the action taken may not be what the driver wishes, the action will be short-lived (since it only persists while the vehicle is stopped in traffic).

In general, then, the inventive override module 46 (1) monitors for conditions indicating that the automatic start-stop function is about to be implemented in order to shut off the internal combustion engine; and (2) generates an automated engine stop defeating message. Other automated engine stop defeating messages include sending a short interval of low battery messages and sending a short interval of low vehicle speed messages so that the BCU/ECU "thinks" the vehicle is creeping forward;

The selection of the automated engine stop defeating messages used should be made to avoid interference with the vehicle's normal operations. For this reason, the brake status message is particularly desirable. A momentary "off" status for this message type just suggests that the driver has briefly lifted his or her foot from the brake pedal. This action is unlikely to interfere with other functions.

The reader should note that in some embodiment the brake pedal switch is directly wired to the BCU (rather than communicating via a data bus). For those instances it is desirable to provide a module such as shown in FIG. 2 that would directly alter the perceived state of the brake pedal switch. This implementation is within the scope of the invention as well.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that are ultimately drafted rather than the examples given.

Having described our invention, we claim:

1. A method for automatically overriding an automated engine start-stop feature in a vehicle having said automated engine start-stop feature implemented using multiple controllers in communication with a communication bus, comprising:
   (a) providing an override module in communication with said communication bus;
   (b) said override module monitoring said communication bus for a first message indicating that a speed of said vehicle is zero and a second message indicating that a brake of said vehicle is on; and
   (c) after detecting said first and second messages, and while a brake of said vehicle is on, said override module placing a brake status: off message on said communication bus and continuing to periodically place a brake status: off message on said communication bus until said override module detects a message on said communication bus indicating that said vehicle speed is above zero.

2. The method for automatically overriding an automated engine start-stop feature as recited in claim 1, wherein said override module remains in a dormant condition until said vehicle speed approaches zero.

3. A method for automatically overriding an automated engine start-stop feature in a vehicle having an automated engine start-stop feature implemented using an engine controller in communication with a communication bus, comprising:
   (a) providing an override module in communication with said communication bus;
   (b) said override module monitoring said communication bus for a first message indicating that a speed of said vehicle is zero and a second message indicating that a brake of said vehicle is on;
   (c) after detecting said first and second messages, and while a brake of said vehicle is on, said override module reading a present value for a steering wheel angle of said vehicle from said communication bus; and
   (d) said override module incrementing said present value for said steering wheel angle and placing said incremented value on said communication bus.

4. The method for automatically overriding an automated engine start-stop feature as recited in claim 3, wherein said override module periodically retransmits said incremented value for said steering wheel angle on said communication bus, until such time as said override module detects a message on said communication bus indicating that said vehicle speed is above zero.

5. The method for automatically overriding an automated engine start-stop feature as recited in claim 3, wherein said override module remains in a dormant condition until a vehicle speed approaches zero.

6. A method for automatically overriding an automated engine start-stop feature in a vehicle having said automated start-stop feature implemented using a controller in communication with a communication bus, comprising:
   (a) providing an override module in addition to said controller implementing said automated engine start-stop features, said override module being in communication with said communication bus;
   (b) said override module monitoring said communication bus for a first message indicating that a speed of said vehicle is zero and a second message indicating that a brake of said vehicle is on;
   (c) said override module, after said first and second messages have been detected, and while a brake of said vehicle remains on, placing a brake status: off message on said communication bus; and
   (d) said override module repeatedly placing a new brake status: off message on said communication bus until such time as said override module detects a message on said communication bus indicating that said speed of said vehicle is above zero.

7. The method for automatically overriding an automated engine start-stop feature as recited in claim 6, wherein said override module remains in a dormant condition until a vehicle speed approaches zero.

* * * * *